United States Patent [19]
Dietrich et al.

[11] Patent Number: 5,886,062
[45] Date of Patent: Mar. 23, 1999

[54] PROCESS FOR THE PRODUCTION OF RIGID POLYURETHANE FOAMS

[75] Inventors: Karl-Werner Dietrich, Odenthal; Torsten Heinemann, Köln; Manfred Dietrich, Leverkusen, all of Germany

[73] Assignee: Bayer Aktiengesellschaft, Leverkusen, Germany

[21] Appl. No.: 904,894

[22] Filed: Aug. 1, 1997

[30] Foreign Application Priority Data

Aug. 28, 1996 [DE] Germany ............... 196 34 700.9

[51] Int. Cl.$^6$ .................................................. C08G 18/50
[52] U.S. Cl. ..................... 521/167; 521/131; 521/173
[58] Field of Search .................... 521/167, 173, 521/131

[56] References Cited

U.S. PATENT DOCUMENTS

| | | | |
|---|---|---|---|
| 2,955,091 | 10/1960 | Kane | 260/2.5 |
| 4,225,678 | 9/1980 | Ray | 521/101 |
| 5,258,418 | 11/1993 | Krueger et al. | 521/164 |
| 5,260,347 | 11/1993 | Krueger et al. | 521/164 |
| 5,350,780 | 9/1994 | Welte et al. | 521/173 |
| 5,451,615 | 9/1995 | Birch | 521/132 |
| 5,583,197 | 12/1996 | Harrison et al. | 528/74.5 |
| 5,688,835 | 11/1997 | Scherbel et al. | 521/131 |

FOREIGN PATENT DOCUMENTS

| | | |
|---|---|---|
| 893746 | 4/1962 | United Kingdom . |
| 915157 | 1/1963 | United Kingdom . |
| 1592534 | 7/1981 | United Kingdom . |

OTHER PUBLICATIONS

Kunststoff–Handbuch, (Handbook of Plastics), vol. 7, 1st Edition (month unavailable) 1966, edited by R. Vieweg and A. Höchtlen.

2nd Edition, Polyurethane, Kunststoff–Handbuch (month unavailable) 1983, edited by G. Oertel. (Carl Hanser Verlag, Munich).

*Primary Examiner*—Rachel Gorr
*Attorney, Agent, or Firm*—Joseph C. Gil; N. Denise Brown

[57] ABSTRACT

This invention provides a process for producing rigid polyurethane foams by reacting A) a polyol component with B) a polyisocyanate component in the presence of C) water, D) at least one catalyst, and, optionally, E) at least one blowing agent. This process specifically requires A) a polyol component which comprises: 1) a polyol containing at least two isocyanate-reactive hydrogen atoms and comprising: a) a mixture of i) an addition product having a OH number of at least 500 of diamines or polyamines containing primary and/or secondary amino groups with alkylene oxides, and ii) castor oil, and/or b) one or more reaction products obtained by reacting i) an addition product having a OH number of at least 500 of diamines or polyamines containing primary and/or secondary amino groups with alkylene oxides, and ii) castor oil; and 2) at least one compound containing at least two isocyanate-reactive hydrogen atoms. Suitable polyisocyanates B) for the present invention are those containing an NCO group content of from 20 to 48% by weight.

9 Claims, No Drawings

PROCESS FOR THE PRODUCTION OF RIGID POLYURETHANE FOAMS

BACKGROUND OF THE INVENTION

The present invention relates to a new process for the production of substantially closed-cell polyurethane foams.

Processes for producing substantially closed-cell rigid foams containing urethane, urea and biuret groups are generally known.

A review of the production of corresponding rigid foams is given for example in Kunststoff-Handbuch, (Handbook of Plastics), Vol. 7, 1st Edition 1966, edited by R. Vieweg and A. Höchtlen and 2nd Edition 1983, edited by G. Oertel, (Carl Hanser Verlag, Munich).

Rigid foams such as these are normally produced by reacting aromatic polyisocyanates with polyols, preferably polyether polyols or polyester polyols, in the presence of blowing agents, catalysts, and, optionally, auxiliaries and additives.

The fluorochlorohydrocarbons such as R11 that were previously preferably used as blowing agents have been replaced. In particular, these conventional fluorochlorohydrocarbons were replaced due to their ozone-destructive properties, by blowing agents such as, for example, partially halogenated fluorochlorohydrocarbons such as, for example, R141b (1,1,1-dichlorofluoroethane), fluorohydrocarbons, as well as low boiling point alkanes such as, for example, n-pentane, isopentane and cyclopentane.

Rigid polyurethane foams are used, for example, in the production of composite elements or sandwich elements, or in filling cavities in household appliances such as domestic refrigerating equipment, for example, refrigerators or freezers, or insulating storage water heaters.

In the past, the renewable raw material castor oil, a triglyceride widely used in the chemical industry, was used in the production of polyurethanes. Castor oil is suitable for this purpose since it has about three hydroxyl groups per molecule. Castor oil, however, could not previously be used in large amounts (i.e., more than 20 parts by weight of the polyol formulation) in the production of rigid polyurethane foams since its OH number is too low and the resultant rigid foams have an insufficient mechanical stability, particularly in the case of rigid foams having bulk densities below 50 kg/m$^3$. The use of large amounts of the renewable raw material castor oil in the production of rigid polyurethane foams is, however, of interest for both economic and ecological reasons.

Thus, the object of the invention was to provide a process for the production of rigid polyurethane foams wherein more than 20 parts by weight of castor oil may be present in the polyol formulation, and that yields products which can be used industrially without any problem.

It has now surprisingly been found that these objects can be achieved by using the polyol formulations according to the invention.

SUMMARY OF THE INVENTION

The invention provides a process for the production of rigid polyurethane comprising reacting A) a polyol component with B) a polyisocyanate component in the presence of C) water, D) at least one catalyst, and, optionally, E) at least one blowing agent. In the process of the present invention,
A) said polyol component comprises:
1) 80–100% by weight, based on the total weight of component A), of a polyol containing at least two isocyanate-reactive hydrogen atoms, said polyol A)1) comprising
   a) 0–100% by weight, based on the total weight of component A)1), of a mixture comprising
      i) 20–80% by weight, based on the total weight of A)1)a), of an addition product having an OH number of at least 500, and being prepared by reacting at least one diamine or at least one polyamine which contains primary and/or secondary amino groups with at least one alkylene oxide,
      ii) 20–80% by weight, based on the total weight of A)1)a), of castor oil, and
   b) 0–100% by weight, based on the total weight of component A)1), of one or more reaction products obtained by reacting
      i) an addition product having an OH number of at least 500, and being prepared by reacting at least one diamine or at least one polyamine which contains primary and/or secondary amino groups with at least one alkylene oxide, with
      ii) castor oil, and
2) 0–20% by weight, based on the total weight of component A), of at least one compound containing at least two isocyanate-reactive hydrogen atoms,
with the proviso that components A)1)i) and A)2) are different compounds, and that components A)1)b) and A)2) are different compounds; and
B) said polyisocyanate component contains an NCO group content of from 20 to 48% by weight.

In accordance with the present invention, suitable polyol component A) comprises 1) from 80 to 100% by weight, based on the total weight of component A), of a polyol containing at least two isocyanate-reactive hydrogen atoms and which comprises a) a mixture of i) an addition product having an OH number of at least 500, and ii) castor oil, and/or b) one or more reaction products obtained by reacting i) an addition product having an OH number of at least 500, with ii) castor oil.

Polyol component A)1) may comprise 100% by weight (based on the total weight of A)1), of mixtures a); 100% by weight (based on the total weight of A)1), of one or more reaction products b); or some of both a) and b).

Suitable polyol components A)1)a)i) and A)1)b)i) comprise the reaction products of diamines or polyamines containing primary and/or secondary amino groups with alkylene oxides. These reaction products have OH numbers of at least 500. Suitable alkylene oxides for forming these reaction products include, for example, ethylene oxide, propylene oxide, butylene oxide, dodecyl oxide or styrene oxide. Propylene oxide, ethylene oxide and mixtures thereof are preferred. Suitable as starter compounds in the formation of these reaction products are those diamines or polyamines that contain at least one primary or secondary amino group. Diamines and polyamines containing at least one primary or secondary amino group include, for example, aliphatic amines such as ethylenediamine, various oligomers of ethylenediamine such as, for example, diethylenetriamine, triethylenetetramine and pentaethylene-hexamine, 1,3-propylenediamine, 1,3- and 1,4butylenediamine, 1,2-, 1,3-, 1,4-, 1,5-, 1,6-hexamethylenediamine, and aromatic amines such as, for example, phenylenediamines, toluene diamines such as, for example, 2,3-toluenediamine, 3,4-toluenediamine, 2,4-toluenediamine, 2,5-toluenediamine, 2,6-toluenediamine and mixtures of the afore-mentioned isomers, 2,2'-diaminodiphenylmethane, 2,4'- diaminodiphenyl-methane, 4,4'diaminodiphenylmethane and mixtures of these isomers, etc.

As used in the present invention, diamines and/or polyamines containing primary and/or secondary amino groups do not include alkanolamines such as, for example, ethanolamine, diethanolamine, etc.

A particularly preferred reaction product to be used as component A)1)a)i) and/or A)1)b)i) is the polyaddition product of 2 to 4 moles of at least one alkylene oxide, most preferably 3 to 3.8 moles, with an isomeric mixture of 2,3-toluenediamine and 3,4-toluenediamine.

Polyol component A) of the present invention may also comprise 2) from 0 to 20% by weight, based on the total weight of A), of at least one compound containing at least two hydrogen atoms which are isocyanate-reactive. Suitable compounds include those conventional isocyanate-reactive compounds which are known to be useful in the production of rigid polyurethane foams. Typically, these compounds have a molecular weight of, for example, from about 200 to about 12,500 g/mole. Such compounds are understood to include, for example, besides compounds containing amino groups, those compounds containing thiol groups or carboxyl groups, and preferably compounds containing hydroxyl groups such as, for example, polyether polyols or polyester polyols containing at least two hydroxyl groups. In particular, suitable polyol compounds A)2) more preferably contain from 2 to 8 hydroxyl groups, and most preferably those compounds having a molecular weight of from 300 to 2,000, such as, for example, polyether polyols or polyester polyols containing from 2 to 8 hydroxyl groups, as well as, for example, polycarbonates or polyester amides, such as are known per se for the production of homogeneous and cellular polyurethanes. Examples of these compounds are described in, for example, DE-A 2,832,253, pp. 11–18. Suitable polyol compounds A)2) for the present invention are clearly different than compounds A)1)a)i) and A)1)b) as described above. It is preferred that compounds A)1)a)i) and A)1)b) are excluded from polyol compounds A)2).

The reaction between the polyol component A) and the polyisocyanate component B) occurs in the presence of C) water, D) at least one catalyst, and, optionally E) at least one blowing agent.

Water, component C), is preferably present in an amount such that there is from 1 to 7% by weight of water (based on the total weight of component A)). When water is used as a blowing agent in the process of the present invention, the quantity of water present should be such that there is about 5 to about 20% by weight of water, based on the total weight of component A).

Blowing agents, component E), may also be used in the process of the present invention for producing rigid polyurethane foams. Examples of suitable blowing agents E) include compounds such as alkanes such as, for example, n-pentane, isopentane, mixtures of isopentane and n-pentane, cyclopentane, cyclohexane, mixtures of butane isomers and the aforementioned alkanes, partially halogenated fluorochlorohydrocarbons such as, for example, 1,1, 1-dichlorofluoro-ethane (R141b), partially fluorinated hydrocarbons such as, for example, 1,1,1,3,3,3-hexafluorobutane (R356) or 1,1,1,3,3-pentafluoropropane (R245 fa). Cyclopentane is the preferred blowing agent. When a blowing agent is present in the process of the present invention, the amount of blowing agent typically used is such that there is from about 5 to about 20% by weight of blowing agent present, based on the total weight of component A).

According to the present invention, suitable catalysts D) include those conventional catalysts known per se in polyurethane chemistry are used. Suitable catalysts are present in the process of the invention in an amount of about 0.1 to 4% by weight, based on the total weight of component A).

Polyisocyanates to be used as component B) in the present invention include, for example, aromatic polyisocyanates such as those which are described by W. Siefken in Justus Liebigs Annalen der Chemie, 562, pp. 75 to 136. These typically correspond to the formula Q(NCO)$_n$, wherein n represents 2 to 4, preferably 2, and Q represents an aliphatic hydrocarbon radical having 2 to 18, preferably 6 to 10 C atoms, a cycloaliphatic hydrocarbon radical having 4 to 15, preferably 5 to 10 C atoms, an aromatic hydrocarbon radical having 8 to 15, preferably 8 to 13 C atoms.

Suitable such polyisocyanates are described in, for example, DE-OS 2,832,253, at pp. 10 to 11.

Particularly preferred compounds include those industrially, readily accessible polyisocyanates such as, for example, 2,4- and 2,6-toluene diisocyanate as well as various mixtures of these isomers ("TDI"), polyphenylpolymethylene polyisocyanates, such as are produced by aniline-formaldehyde condensation followed by phosgenation ("crude MDI"), and polyisocyanates containing carbodiimide groups, urethane groups, allophanate groups, isocyanurate groups, urea groups or biuret groups ("modified polyisocyanates"), and in particular modified polyisocyanates which are derived from 2,4- and 2,6-toluene diisocyanate or from 4,4'- and/or 2,4'-diphenylmethane diisocyanate.

It is also possible that the polyisocyanate component may be a prepolymer of one of the aforementioned isocyanates and an organic compound containing at least one hydroxyl group. Suitable organic compounds for the formation of prepolymers include, for example, polyether polyols or polyester polyols which contain 1 to 4 hydroxyl groups and have molecular weights of from 60 to 1,400.

In addition, additives such as, for example, paraffins, fatty alcohols or dimethyl polysiloxanes, and also pigments or dyes, as well as stabilizers against aging and weathering, plasticizers and substances having a fungistatic and bacteriostatic action, and fillers such as, for example, barium sulphate, Kieselguhr, carbon black or prepared chalk, may be present along with the catalyst(s) and water. Further examples of surfactant additives and foam stabilizers as well as cell regulators, reaction retarders, stabilizers, flame retardants, dyes and fillers and also substances having a fungistatic and bacteriostatic action, all of which may optionally be used concomitantly according to the invention, as well as details of the use and mode of action of these additives, are described in, for example, Kunststoff-Handbuch, Vol. VII, edited by Vieweg and Höchtlen, Carl Hanser Verlag, Munich 1966, pp 121 to 205, and 2nd Edition 1983, edited by G. Oertel (Carl Hanser Verlag, Munich).

According to the invention, the foaming process to produce the rigid foams may also be carried out in closed molds. The reaction mixture is added to a mold, suitable mold materials being metals, for example aluminium, or plastics such as, for example, an epoxy resin. The expandable reaction mixture foams in the mold and forms the molding. The foam molding process can be carried out so that the surface of the molding has a cellular structure. It may, however, also be carried out so that the molding has a compact solid skin and a cellular core. According to the invention, in the first case, the procedure is to add such an amount of foamable reaction mixture to the mold that the resultant foam just fills the mold. In the latter case, the procedure is to add more foamable reaction mixture to the mold than is required to fill the interior of the mold with foam. In the latter case, the foaming is thus carried out under conditions of "overcharging", a procedure that is known in the art and described in, for example, U.S. Pat. Nos. 3,178,490 and 3,182,104, the disclosures of which are herein incorporated by reference.

The present invention also provides for the use of the rigid foams produced according to the invention as intermediate layers in composite or sandwich elements, and for filling cavities in refrigeration equipment.

The process of the present invention is preferably used to fill cavities in refrigerators and freezers.

Foams can obviously also be produced by slabstock foaming or by twin conveyor belt processes known per se.

The rigid foams obtainable according to the invention can be used, for example, in building and construction as well as to insulate central heating pipes and containers.

As used herein, the term molecular weight refers to the number average molecular weight as determined by end group analysis.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Polyol A 9 kg of an isomeric mixture of 2,3-toluenediamine and 3,4-toluenediamine were placed in a 100 l capacity reactor suitable for reactions involving alkylene oxides. After thoroughly flushing with nitrogen at 90° to 150° C. and at a nitrogen pressure of 2 to 4 bar, 15 kg of propylene oxide (3.5 moles/mole of toluenediamine) were metered into the isomeric mixture of TDA in the reactor within 2 hours. After 2 hours' post-reaction the reaction mixture was cooled. 24 kg of a polyether having the following analytical data were obtained:

OH number: 605
Viscosity: 2200 mpa·s (75° C.)

Polyol B

A polyether polyol started from sucrose, ethylene glycol and water, by anionic polyaddition with 1,2-propylene oxide, and having a molecular weight of 350 and an OH number of about 450.

Example 1: (comparative)

The following formulation was used in the process of preparing a polyurethane rigid foam.

Component A
  50 parts by weight of castor oil
  50 parts by weight of polyol B
  2 parts by weight of silicone stabilizer (commercially available as B8423, from Goldschmidt)
  3 parts by weight of activator (commercially available as Desmorapid 726b, from Bayer AG)
  2 parts by weight of water Isocyanate A
  a crude MDI comprising polymeric MDI, NCO content 31.5 wt. % (commercially available as Desmodur 44V20 from Bayer AG) 100 parts by weight of component A were mixed with 12 parts by weight of cyclopentane and 100 parts by weight of Isocyanate A in a stirrer (at 2000 revs/min) at 20° C. The mixture was then poured into an open mold having a base area of 20×20 cm², and allowed to foam.

After the end of the foaming reaction, a partially collapsed, coarse cellular, tough material was obtained.

Example 2

The following formulation was used to prepare a polyurethane rigid foam in accordance with the present invention.

Component A
  50 parts by weight of castor oil
  50 parts by weight of polyol A
  2 parts by weight of silicone stabilizer (commercially available as B8423, from Goldschmidt)
  3 parts by weight of activator (commercially available as Desmorapid 726b, from Bayer AG)
  2 parts by weight of water
  100 parts by weight of component A were mixed with 14 parts by weight of cyclopentane and 110 parts by weight of Isocyanate A in a stirrer (at 2000 revs/min) at 20° C. The mixture was then poured into an open mold with a base area of 20×20 cm², and allowed to foam.

After the foaming reaction was completed, a fine-celled polyurethane rigid foam was obtained.

Example 3

The following formulation was used to prepare a polyurethane rigid foam in accordance with the present invention.

Component A
  40 parts by weight of castor oil
  40 parts by weight of polyol A
  20 parts by weight of polyol B
  2 parts by weight of silicone stabilizer (commercially available as B8423, from Goldschmidt)
  3 parts by weight of activator, (commercially available as Desmorapid 726b, from Bayer AG)
  2 parts by weight of water
  100 parts by weight of component A were mixed with 14 parts by weight of cyclopentane and 112 parts by weight of Isocyanate A in a stirrer (at 2000 revs/min) at 20° C. The mixture was then poured into an open mold having a base area of 20×20 cm², and allowed to foam completely.

After the end of the foaming reaction, a fine-cell polyurethane rigid foam was obtained.

These examples demonstrate that when large amounts of castor oil are used, polyurethane rigid foams can only be obtained by the process according to the present invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the production of polyurethane rigid foams, comprising reacting A) a polyol component with B) an isocyanate component, in the presence of C) water, D) at least one catalyst, and, optionally, E) at least one blowing agent, the improvement wherein:

A) said polyol component comprises
  1) 80–100% by weight, based on the total weight of component A), of a polyol containing at least two isocyanate-reactive hydrogen atoms and comprising
    a) 0–100% by weight, based on the total weight of component A)1), of a mixture comprising
      i) 20–80% by weight, based on the total weight of A)1)a), of an addition product having a OH number of at least 500, and being prepared by reacting at least one aromatic diamine or at least one aromatic polyamine which contain primary and/or secondary amino groups with at least one alkylene oxide, and
      ii) 20–80% by weight, based on the total weight of A)1)a), of castor oil, and
    b) 0–100% by weight, based on the total weight of component A)1), of one or more reaction products obtained by reacting
      i) an addition product having an OH number of at least 500, and being prepared by reacting at least one aromatic diamine or at least one aromatic polyamine which contain primary and/or secondary amino groups with at least one alkylene oxide, with
      ii) castor oil, and
  2) 0–20% by weight, based on the total weight of component A), of at least one compound containing at least two isocyanate-reactive hydrogen atoms,
  with the proviso that components A)1)a)i) and A)2) are always different compounds, and that components A)1)b) and A)2) are always different compounds; and B) said polyisocyanate component has an NCO group content of from 20 to 48% by weight.

2. The process of claim 1, wherein A) said polyol component and B) said polyisocyanate are additionally reacted in the presence of E) at least one blowing agent.

3. The process of claim 1, wherein A) said polyol component and B) said polyisocyanate are additionally reacted in the presence of additives.

4. The process of claim 1, wherein A) said polyol component and B) said polyisocyanate are additionally reacted in the presence of flame retardants.

5. The process of claim 1, wherein the aromatic polyamine comprises an isomeric mixture of 2,3-toluenediamine and 3,4-toluenediamine.

6. The process of claim 1, wherein components A)1)a)i) and A)1)b)i) comprise polyaddition products of 2 to 4 moles of alkylene oxides with an isomeric mixture of 2,3-toluenediamine and 3,4-toluene-diamine.

7. The process claim 2, wherein E) said blowing agents comprises cyclopentane, n-pentane, iso-pentane, or mixtures thereof.

8. The process of claim 2, wherein E) said blowing agent comprises at least one partially halogenated fluorochlorohydrocarbon.

9. The process of claim 2, wherein E) said blowing agent comprises at least one fluorohydrocarbon.

* * * * *